(No Model.)

E. H. MOTT.
HAND CART.

No. 418,339. Patented Dec. 31, 1889.

WITNESSES.
Rich. George
Edmund Risley

INVENTOR.
E. H. Mott
By Risley & Perry
attys

UNITED STATES PATENT OFFICE.

E. HICKS MOTT, OF ONEIDA, NEW YORK.

HAND-CART.

SPECIFICATION forming part of Letters Patent No. 418,339, dated December 31, 1889.

Application filed June 10, 1889. Serial No. 313,682. (No model.)

*To all whom it may concern:*

Be it known that I, E. HICKS MOTT, of Oneida, in the county of Madison and State of New York, have invented certain new and useful Improvements in Trucks or Carts; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an improvement in trucks or carts.

Figure 1:
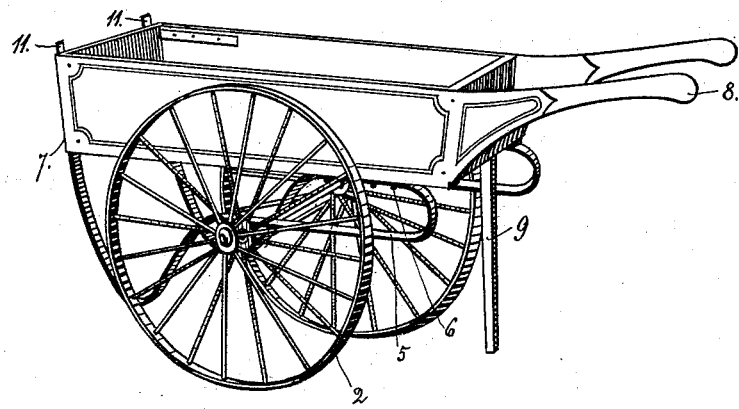
Figure 2:
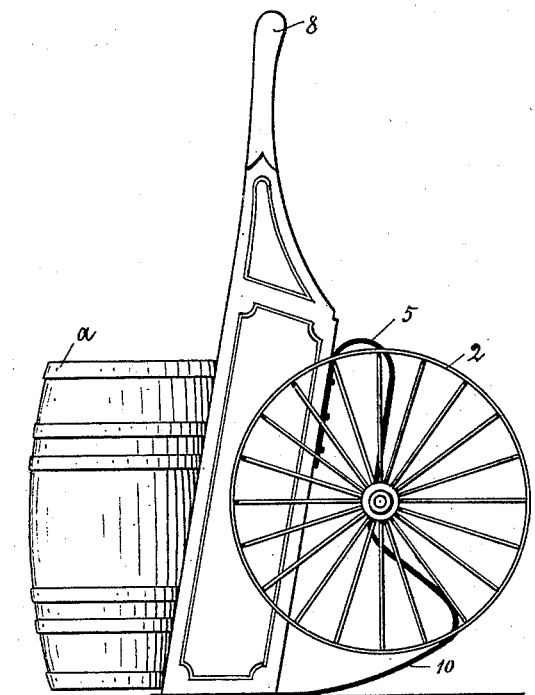
Figure 3:
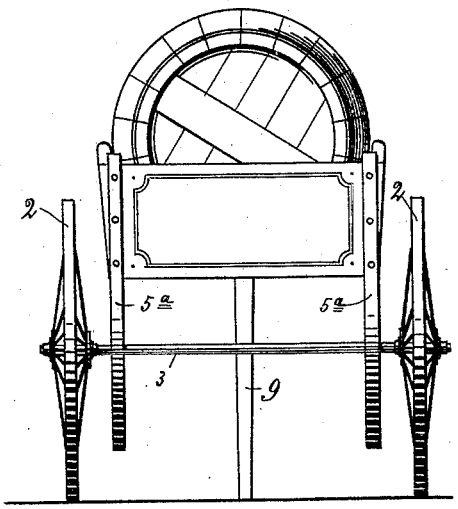

In the drawings which accompany and form part of this specification, Figure 1 illustrates my truck or cart in an upright position. Fig. 2 shows the same in position when the load is to be taken aboard, and Fig. 3 represents an end view when the load is on the truck or cart.

Similar figures of reference refer to like parts in the several figures.

In constructing my truck or cart, wheels 2 2, of suitable construction, are mounted upon axle 3, which carries or supports platform 4. The platform may be supported from the axle on lever-arms 5 5$^a$, which may be secured to the platform at 6 and 7 and to the axle, as shown, and to the rear of the truck or cart. The platform is preferably provided with handles 8, and standard 9 may be used for supporting the truck in the position shown in Fig. 1.

The particular feature to which attention is invited is the curved extremity of the lever-arms 5$^a$, which curve from their extremity inwardly toward the axle, and is not a definitely-determined curve, and may be substantially of the same curvature with the circumference of the wheel, a little in advance of the same. The ends 11 11 of the arms may project above the platform, and may be formed in one piece running substantially parallel with the upper edge of the platform a little above the same, in order to facilitate the loading of the truck or cart.

It will be observed that arms 5 and 5$^a$ in their construction act as springs to the platform. The springs may be dispensed with, and the arms may be formed at the rear and underneath the platform, forming a continuous curve from the upper ends toward the axle, and the arms may be formed by the circular end of the truck, the circular end curving toward the axle. Latch 12, pivoted in the frame and having a hook for engaging the article to be loaded, may be provided.

The device may be used as follows: When it is desired to load, the truck or cart is placed in the position shown in Fig. 2, and projections 11 11, or their equivalents, introduced under the article, and the latch provided with catch upon the end is brought in contact with the article to be loaded, when the handle will bring the truck and load into the position shown in Fig. 3, loaded on the truck or cart. The inwardly-curved ends of the arms form a shifting-fulcrum on the floor when the truck or cart is moved from the position shown in Fig. 2 into the position shown in Fig. 3, and by the curvature of the arms the greatest leverage is constantly exerted until the load is brought into the position shown in Fig. 3.

It is evident that a succession of inclined offsets from the extremity of the lever-arms toward the axle-tree might be substituted for the curved bearing, and I would consider this the equivalent of my curves.

What I claim as new, and desire to secure by Letters Patent, is—

1. The combination, in a truck, of the lever-arms projecting in advance of the circumference of the wheels and curving downward and inward from their extremities and secured to the platform.

2. The combination, in a truck, of the lever or arms projecting in advance of the circumference of the wheels and curving from their extremities toward the axle-tree.

3. The combination, in a truck, of the levers or arms secured to the frame in advance of the circumference of the wheels and curving from their extremities toward the axle-tree and secured thereto.

4. The combination, in a truck, of the spring lever-arms secured to the platform in advance of the circumference of the wheels and curving inwardly toward the axle and secured thereto, and curving upwardly from the axle and secured to the platform.

In witness whereof I have affixed my signature in presence of two witnesses.

E. HICKS MOTT.

Witnesses:
C. W. MOTT,
A. W. BARKER.